United States Patent [19]
Pickering

[11] Patent Number: 5,104,608
[45] Date of Patent: Apr. 14, 1992

[54] PROGRAMMABLE CHRISTMAS TREE

[76] Inventor: Harold J. Pickering, 304 Mosser Dr., Lafayette, La. 70508

[21] Appl. No.: 743,925

[22] Filed: Aug. 12, 1991

[51] Int. Cl.$^5$ .............................................. F21V 7/04
[52] U.S. Cl. ...................................... 362/32; 362/123
[58] Field of Search ................................. 362/32, 123

[56] References Cited

U.S. PATENT DOCUMENTS

| | | | |
|---|---|---|---|
| 3,766,376 | 10/1973 | Sadacca et al. | 362/123 |
| 4,060,722 | 11/1977 | Foley | 362/123 |
| 4,068,118 | 1/1978 | Carrington | 362/32 |
| 4,364,102 | 12/1982 | Huppert et al. | 362/123 |
| 4,747,022 | 5/1988 | Lin | 362/32 |
| 4,777,571 | 10/1988 | Morgan | 362/123 |
| 4,858,086 | 8/1989 | Pietrantonio et al. | 362/123 |
| 4,878,157 | 10/1989 | Koch | 362/123 |

OTHER PUBLICATIONS

The Fiberoptics & Laser Handbook by Edward L. Safford, 1984, pp. 52, 53, 58-61, 102-105, 130-133.

Primary Examiner—Carroll B. Dority

[57] ABSTRACT

An artificial Christmas tree including a tree trunk extending from an aperture in an upper wall of a hollow tree base and having a plurality of optical fibers extending internally from the aperture in the base to light emitting points within simulated tree branches attached to the tree trunk by hinged tubular branch connectors. The base includes a light source and a removable cartridge-like disc holding tray for holding and rotating an infinite number of different selected user programmable colored discs between the light source and the optical fibers to create an infinite number of user created light displays within the tree.

20 Claims, 6 Drawing Sheets

PROGRAMMABLE CHRISTMAS TREE

BACKGROUND OF THE INVENTION

This invention relates to artificial Christmas trees. More particularly, the invention relates to an artificial Christmas tree of the type having a fiber optic display of varying colors.

Artificial Christmas trees and decorations including fiber optics for transmitting light from a source through a rotating multi-colored element such as a disc are known and a search of the prior art has uncovered the following patents directed to such artificial trees and displays: U.S. Pat. Nos. 4,858,086; 4,878,157; 4,364,102; 4,878,157 and 4,777,571. As noted, all of these articles of display incorporate either a stationary single colored element or a rotating multi-colored light transmitting element between a light source and one or more optical fibers to transmit the single or multi-colored light through the optical fibers to light emitting points to achieve a desired pattern or effect within the article however, with all of these known devices, the color pattern and effect achieved is fixed. That is, the effect is fixed in terms of its effect which cannot be changed either in the color, sequence or pattern which detracts from the versatility of the display. Over time, the display can become boring or tiresome to an observer due to the repetitive nature of the display or perhaps due to the lack of originality and or over simplicity in the color patterns and sequence of display that the original designer of the display may have provided.

Accordingly, it would be desirable to provide for a display, such as an artificial Christmas tree, which allows for a user to easily change the colors, color pattern and sequence of light display within the tree to any of an infinite number of different arrangements and effects in accordance with the user's preference.

SUMMARY OF THE INVENTION

According to the invention, there is provided a tree base having a tree trunk extending upwardly from an aperture in the upper wall of the base and having a plurality of optical fibers extending internally from the aperture in the base to light emitting points within simulated tree branches attached to the trunk and where the base includes a light source and means for removably holding and rotating an infinite number of different selected user programmable colored discs between the light source and optical fibers.

According to a preferred embodiment, the means for removably holding and rotating the different programmable colored discs includes a disc drive assembly including a drive motor and a disc holding member slidably, removably received in a support and guide assembly within the tree base which is adapted to removably hold and rotate the selected colored discs providing for removal and replacement of the discs by the user.

According to an important feature of the invention, the colored discs are selected from a plurality of programmable light transparent discs each initially being a clear transparent member colorable by the user in any of an infinite number of desired patterns.

According to another important feature of the invention, the disc holding member is a cartridge-like disc tray including a disc holding ring gear adapted to engage with a drive gear on a drive motor in the base with the disc tray positioned within the tree base with the programmable disc supported on the ring gear across the central opening of the ring gear coaxial with the aperture in the tree base.

According to the preferred embodiment, the ring gear is rotatably mounted in the disc tray which disc tray includes a relieved portion at one end providing for exposure of a portion of the toothed outer periphery of the ring gear to allow for engagement of the ring gear with the drive gear in the installed operative position of the tray within the base.

According to the preferred embodiment, a portion of the inner periphery of the ring gear protrudes into a central opening through the disc tray forming an annular shoulder on which the programmable disc is removably supported coaxial with the central opening in the disc tray and aperture in the upper wall of the base.

According to another feature of the invention, the tree trunk comprises at least two longitudinally stepped members removably attached coaxially together forming a longitudinally tiered trunk and having a plurality of openings for mounting the simulated tree branches to the tree trunk.

According to a preferred embodiment, the tiered tree trunk includes at least two concentric longitudinally spaced apart annular shoulders each including a plurality of tree branch connection openings.

According to another feature of the invention, there is provided a plurality of fiber optic guide tubes, one mounted at one end at each tree branch connection opening and extending through the trunk of the tree and opening at a second end to the aperture in the base. Each guide tube carries a fiber optic bundle including a plurality of individual optical fibers.

A still further important feature of the invention provides for a plurality of tubular tree branch connectors, each mounted at one end to one of the tree branch connection openings in the tree trunk and each having a simulated tree branch removably connected at another end with one of the fiber optic bundles extending through each branch connector out into the simulated tree branch connected thereto.

According to yet another important feature of the invention, each tree branch connector is adapted to provide for angular adjustment of the simulated tree branch relative to the tree trunk.

According to a preferred embodiment, each tree branch connector includes a convoluted portion forming a positionable hinge.

According to a still further important feature of the invention, each optical fiber includes a light scattering member at light emitting locations within the simulated tree branchs.

It can be appreciated from the above, and as fully described below, that the artificial Christmas tree according to the invention provides for easily changing the colors, pattern and sequence of the light display emitted from the optical fibers by providing for a cartridge-like disc holder and a plurality of interchangeable user programmable discs.

BRIEF DESCRIPTION OF THE DRAWINGS

The invention will be better understood after reading the following Detailed Description of the Preferred Embodiment in conjunction with the drawings in which.

DETAILED DESCRIPTION OF THE PREFERRED EMBODIMENT

Figure 1:
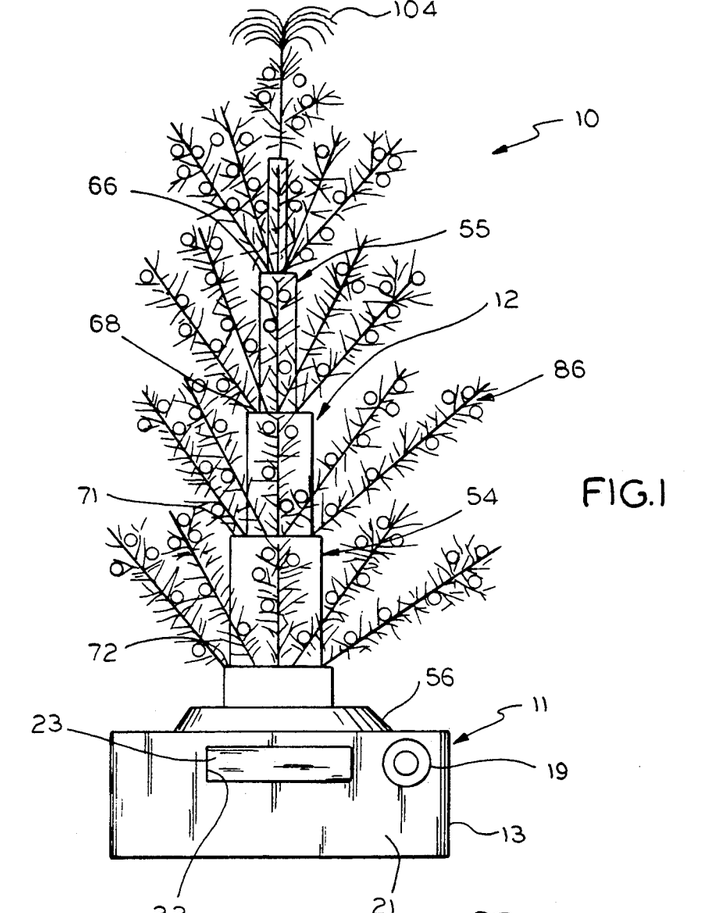
FIG. 1 is a front view of an artificial Christmas tree according to the invention.
Figure 3:
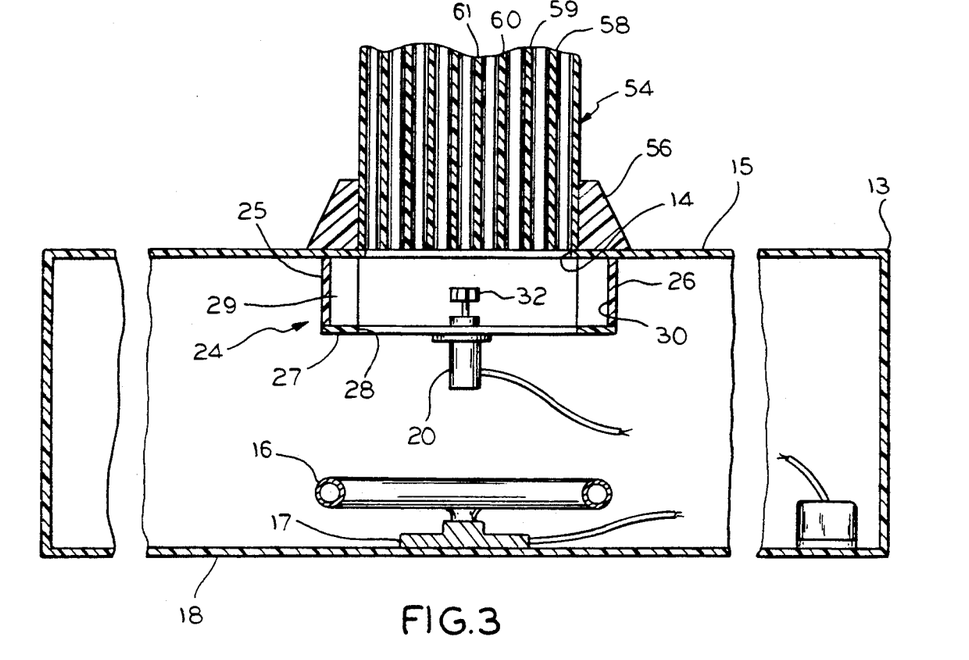
FIG. 3 is a vertical cross-sectional view taken along the line 3—3 in FIG. 2 showing details of construction of the tree base.
Figure 4:
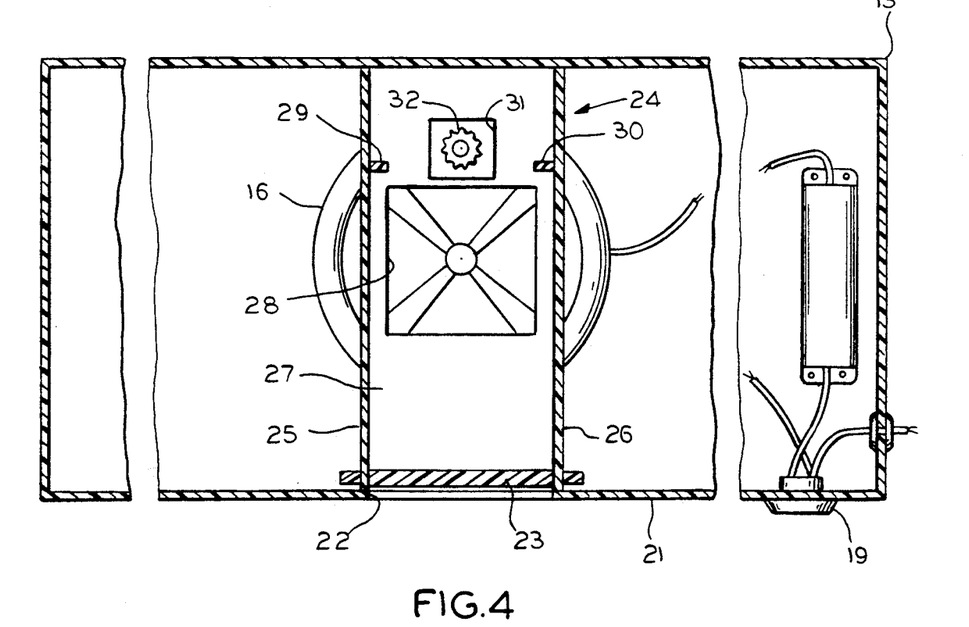
FIG. 4 is a cross sectional view taken along the line 4—4 in FIG. 2 showing further details of construction of the tree base.

Shown in FIG. 1 is an artificial Christmas tree 10 including a base 11 and simulated tree trunk 12. The construction of the base is shown best in FIGS. 2, 3, 4 and 18 and is a container 13 having sufficient mass and a foot print for supporting the tree when assembled. The base is hollow and, as shown in FIGS. 3 and 4, includes a central, preferably circular, aperture 14 in its upper wall 15. A light source 16, either incandescent or fluorescent type, including an appropriate base 17 is mounted to the lower wall 18 of the base in line with the aperture in the upper wall. In the embodiment shown, the light source is a circular type fluorescent bulb for use in a standard incandescent socket that is readily available to consumers. This light source provides sufficient light and operates cooler than an incandescent source which contributes to safety of the tree however, the particular light source is chosen based on the light transmitting characteristics of the particular optical fibers chosen. Those skilled in the art of optical fibers can readily chose a light source having an emmission spectrum compatable with the transmission characteristics of a given optical fiber and the invention is not to be considered limited to any one particular light source or optical fiber. The light source is electrically coupled to an appropriate electrical switch 19 which can be incorporated into a switch which preferably also includes means for controlling the speed of a drive motor 20 described below.

Figures 14A, 14B, 15, 16, 17, 18:
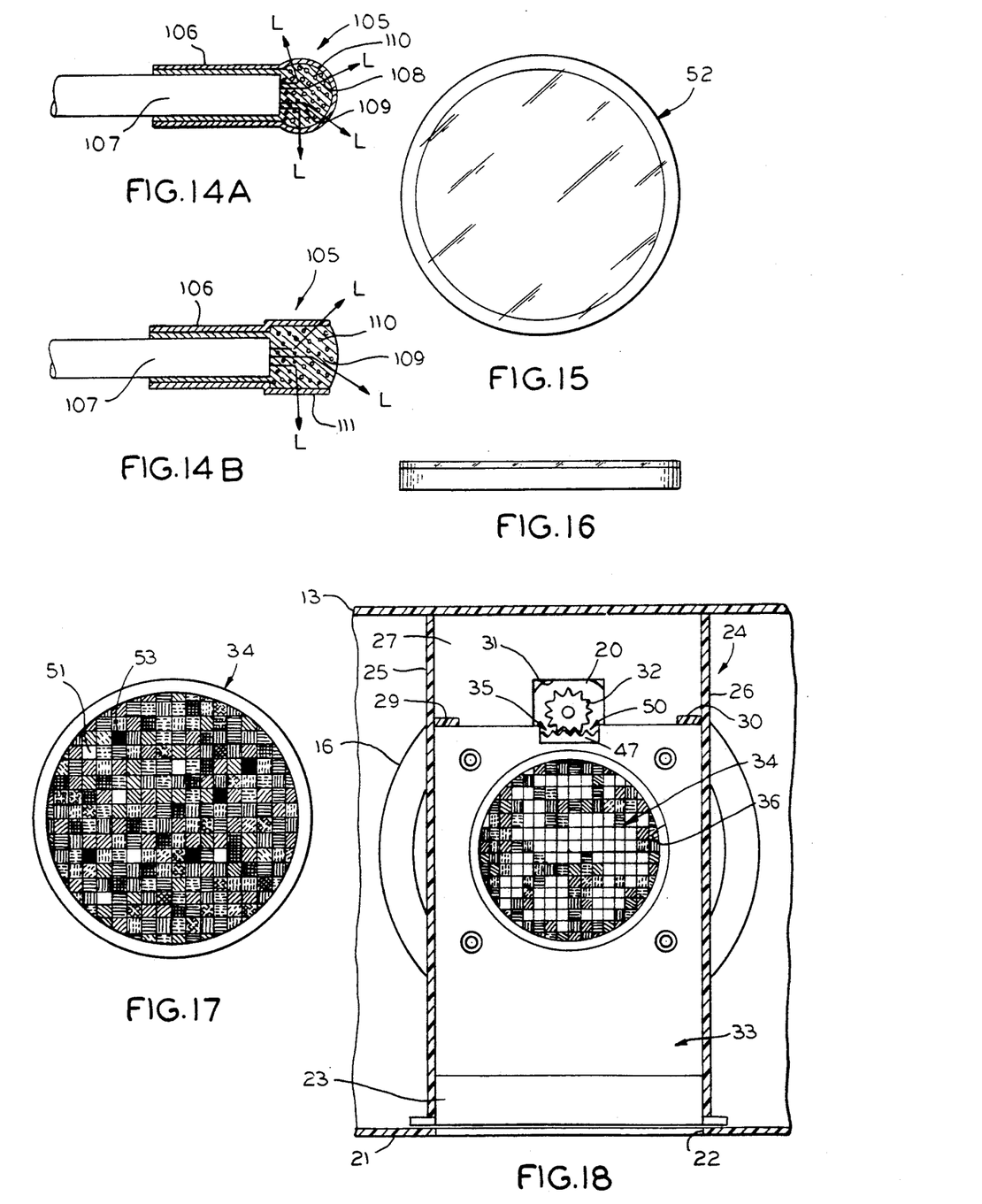
FIG. 14A is an enlarged partial cross sectional view of a light emitting portion of one optical fiber showing details of construction of a preferred light scattering member.
FIG. 14B is an enlarged partial cross sectional view of a light emitting portion of one optical fiber showing details of construction of an alternative light scattering member.
FIG. 15 is a plan view of a light transparent programmable disc prior to being programmed.
FIG. 16 is a side view of the programmable disc according to FIG. 15 showing further details of construction.
FIG. 17 is a plan view of a programmable disc after having been colored programmed.
FIG. 18 is a partial horizontal cross sectional view through the base of the artificial Christmas tree showing the disc holding tray inserted within the disc tray guide in the operative position and holding a programmed disc.

As shown in the drawings, a front wall 21 of the base is provided with an opening 22 including a normally closed spring biased pivotable door 23 which opens into a disc tray support and guide assembly 24 within the base comprising an elongated pan or shelf-like support having side walls 25, 26 affixed to the upper wall of the base and extending between the front and rear walls of the base. A lower support wall 27 extends between the side walls of the support and the guide assembly, between the front and rear walls of the base and is provided with an opening 28 positioned coaxial with the light source and the aperture in the upper wall of the base. As shown in FIGS. 3 and 4, a pair of stops 29, 30 extend respectively from opposite locations on each side wall of the support and guide assembly and the lower support wall is further provided with a second opening 31 through which a drive gear 32 provided on the drive motor extends. The drive motor, which is preferrably a variable speed motor such as a stepper motor is mounted to the under side of the lower support wall. The stops are positioned on the side walls at locations for positioning a cartridge-like disc holding and drive tray 33 within the support and guide assembly such that a programmable colored disc 34 supported by the drive tray is positioned coaxial with the opening in the support wall and aperture in the upper wall of the base. As will be described below, the stops are also located within the support and guide assembly so as to provide for engagement of a driven gear 35 associated with the disc tray with the motor drive gear when the tray is inserted into the tray support and guide assembly as shown in FIG. 18.

As noted, one very advantageous feature of the present invention is the provision for the user to quickly and easily change the colors, pattern and sequence of the light display emitted within the tree. This is accomplished as shown in FIGS. 2 and 17-20 by the removable cartridge-like disc holding and rotating tray hereinabove mentioned which supports and rotates replaceable user programmable color discs. The disc tray, as noted, is a cartridge-like member generally resembling a VCR tape cartridge which is insertable through the opening in the front of the base and is slidably received and supported within the support and guide assembly. The disc tray includes an opening 36 and means for removably supporting, and rotating different selected color discs coaxial to the opening in the support wall of the support and guide assembly, the light source and with the aperture in the upper wall of the base. In this position, as noted, the drive gear on the drive motor engages with the driven gear associated with the disc tray, as shown best in FIG. 18.

Figures 19, 20:
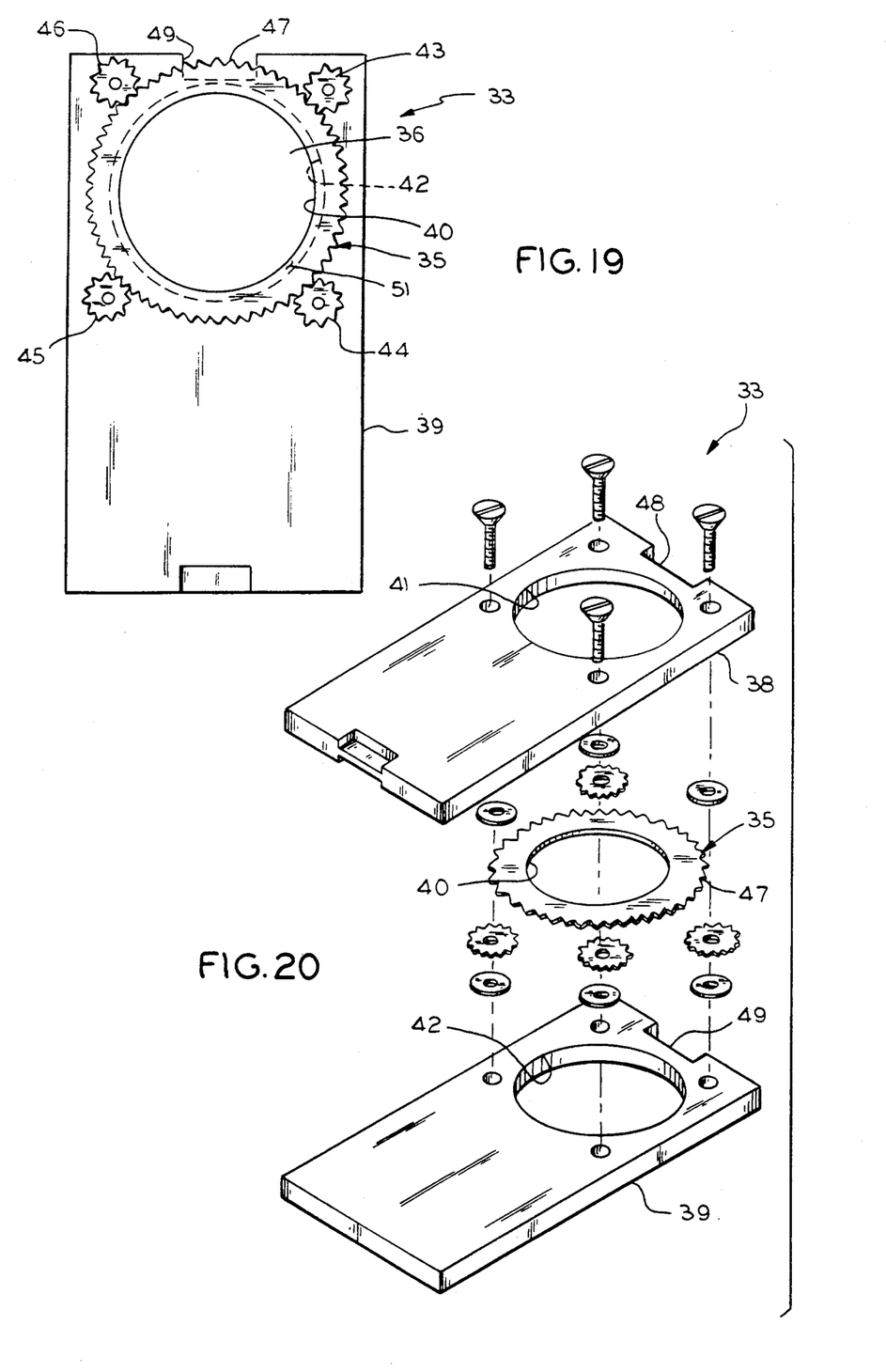
FIG. 19 is a top view of a preferred embodiment of a disc holding tray with one side wall of the tray removed showing details construction.
FIG. 20 is an exploded view of a preferred embodiment of a disc holding tray showing further details of construction.

Referring to FIGS. 19 and 20, a preferred disc tray includes a ring gear 35 rotatably mounted between a pair of side plates 38, 39 with a central opening 40 of the ring gear coaxial to openings 41, 42 in the side plates which form the opening 36 in the disc tray. According to the preferred embodiment, the ring gear is journaled and guided by four smaller gears 43, 44, 45, 46 which are mounted between the side plates and engage with the teeth 47 on the ring gear. One end of each side plate is provided with a cutout 48, 49 which, when the side plates are assembled, form a relief 50 in the end of the disc tray through which a portion of the teeth along the outer periphery of the ring gear rotate and are exposed. As shown in FIG. 18, the relief provides clearance for engagement of the ring gear with the drive gear on the drive motor with the disc tray fully inserted into the disc tray support and guide against the stops. Accordingly, it can be seen that the ring gear is engagable and disengagable with the drive gear whenever the disc tray is inserted and removed from the disc tray support and guide and that the ring gear is rotatably driven by the drive motor which as noted is preferrably a variable speed motor with appropriate control for allowing the speed of the ring gear and thus the rate of change of the color display to be varied by the user.

As shown best in FIG. 19, a portion of the inner periphery of the ring gear protrudes into the openings 41, 42 in the side plates of the disc tray forming an annular shoulder 51 within the opening 36 in the disc tray when the side plates are assembled together on which the replaceable programmable discs are removably supported for rotation with the ring gear.

Figure 5:
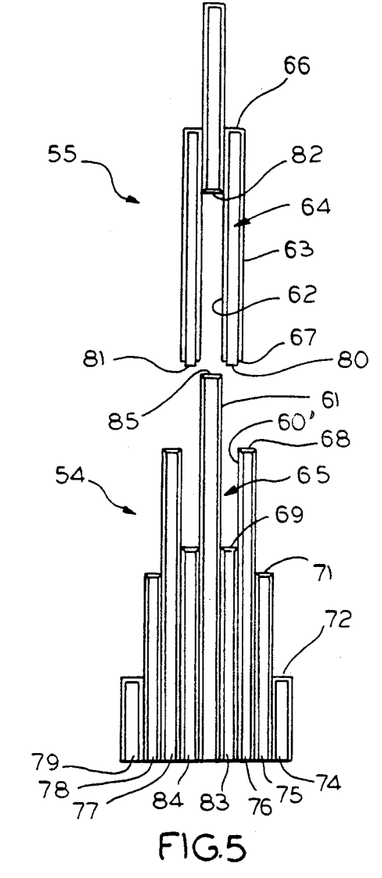
FIG. 5 is an exploded vertical cross sectional view through the tree trunk and fiber optic guide tube assembly showing details of construction.
Figures 6, 8:
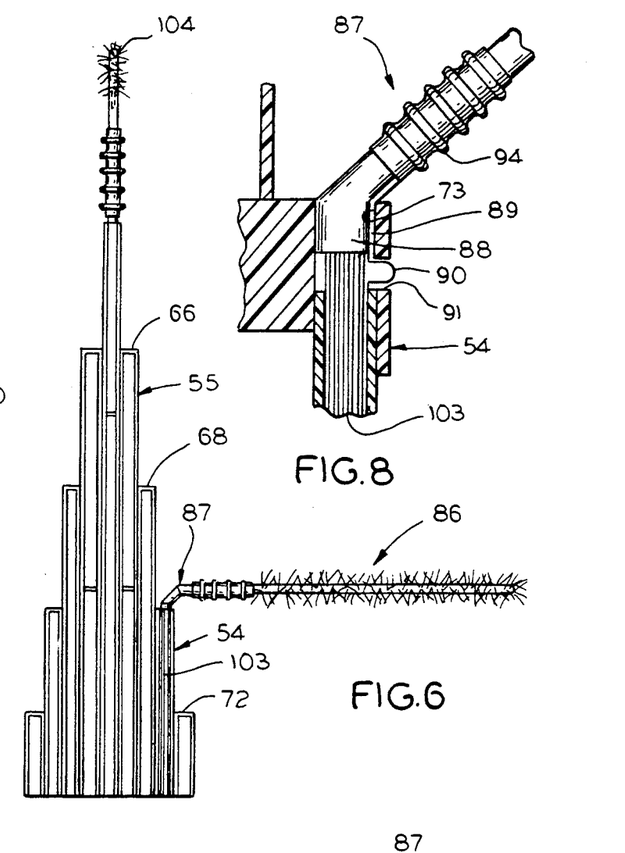
FIG. 6 is a vertical cross sectional view through the assembled tree trunk and fiber optic guide tube assembly showing one simulated tree branch connection.
FIG. 8 is an enlarged cross sectional view of one tree branch connection to the tree trunk showing details of construction.

The colored disc for creating the desired display is selected from an infinite number of initially blank, light transparent, preferably plastic, individual discs 52, as shown in FIG. 15, each programmable, that is, capable of being colored or shaded by the user, in any desired pattern and color scheme. For example, the blank, clear, transparent, programmable disc 52, as shown in FIG. 15, can be programmed into the colored disc 34 as shown, for example, in FIG. 17. Further, as part of the pattern, portions of the disc can be blackened to completely block light transmittance at desired locations 53 to cause a blinking or light extinguishing effect. Conversely, portions of the disc can be left clear, 51, to create a white light effect in addition to colors and blinking. The number of patterns, color schemes and sequences is infinite and is limited only by ones, imagination. Coloring of the discs is easily effected through readily available paints, inks or stickers. Referring now to FIGS. 1-3, 5 and 6, the preferred simulated tree trunk is a multi-piece longitudinally tiered construction including at least two cylindrical tubular members 54, 55 of different diameters removably attached together forming an interior passage along its length. The lower end of the lowermost one 54 of the tree trunk members is removably secured to the base by way of, for example, a mounting collar 56 with the internal passage of the trunk coaxial to the aperture in the base. As shown in FIGS. 3, 5 and 6, according to the preferred embodiment, each trunk member which makes up the tree trunk member 54, 55 is comprised of a plurality of annular concentric walls, such as walls 58, 59, 60, 61 of the lower trunk member 54 as shown in FIG. 3 and walls 62, 63 of the upper trunk member as shown in FIG. 5. As shown in FIG. 5, adjacent walls form longitudinal annular concentric rings and annular voids or receptacles which interconnect as shown in FIG. 6. For example, as shown in FIG. 5, the adjacent annular concentric walls 62, 63 of the upper trunk member 55 form an elongated hollow annular ring 64 having a length extending from the shoulder or tier position 66 to the free end 67 and the adjacent annular walls 60, 61 of the lower trunk member 54 form an elongated annular void or receptical 65 having a depth extending from the annular shoulder or tier 68 to the top 69 of internal guide tubes 83, 84 which are described below. In the embodiment shown, the longitudinal ring 64 of the top trunk member 55 is slidably received within the longitudinal void or receptical 65 of the lower trunk member 54 so as to disconnectably join the adjacent tree trunk members together as shown in FIG. 6. As shown, the annular concentric walls of each trunk member extend longitudinally to different positions along the length of each member which, when the trunk members are interengaged together as shown in FIG. 6, form the externally tiered configuration of the trunk having a plurality of concentric decreasing diameter annular ring shaped landings or shoulders 66, 68, 71, 72 at each ascending tier of the trunk.

Figure 2:
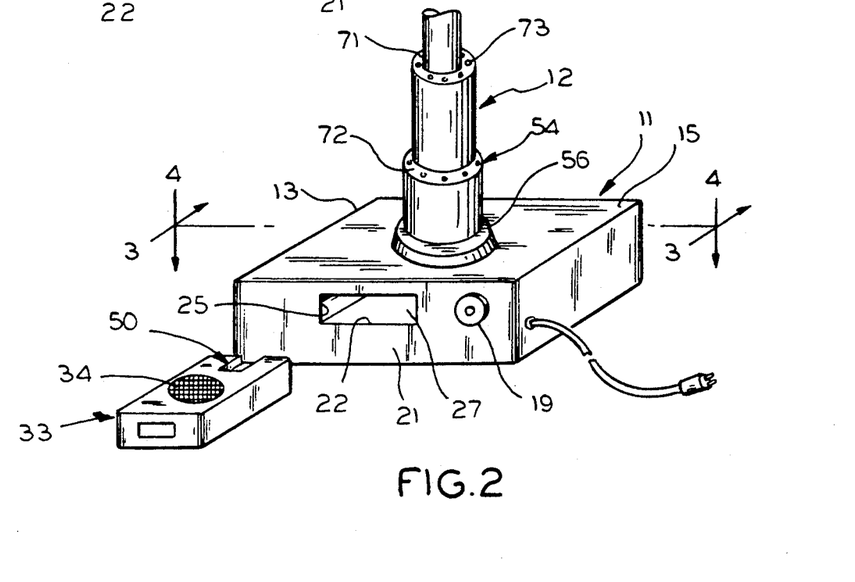
FIG. 2 is a perspective view of the base portion of the programmable Christmas tree according to the invention showing the programmable disc holding tray for insertion into the base of the tree.
Figure 7:
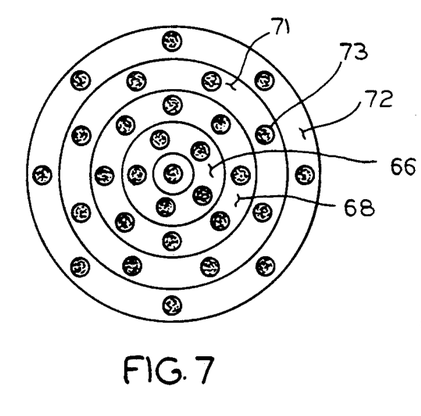
FIG. 7 is a top view of the assembled tree trunk.

As shown best in FIGS. 2, 7 and 8, each annular shoulder of the tree trunk is provided with a plurality of holes or openings, only one of which 73 is designated in the drawings for clarity. Each hole opens into the longitudinal annular void within the interior of the tree truck below the shoulder in which it is provided. Attached to the underside of the shoulder at each hole is a fiber optic bundle guide tube, such as tubes 74, 75, 76, 77, 78, 79, 80, 81, 82 in FIG. 5, which extend from each hole in each tier downwardly through the interior of the trunk terminating at an open end at the lower end of the lower tree trunk member and opening to the aperture in the base. To provide for separation of the trunk members 54, 55, the guide tubes 80, 81, 82 that extend from the holes in the shoulder 66 and the uppermost end of the upper trunk member 55 are two piece tubes. The lower trunk member includes tube portions 83, 84, 85 which coaxially engage to the tube portions 80, 81, 82 in the upper trunk member when the two trunk members are brought together to form continuous but separable guide tubes.

Figure 9:
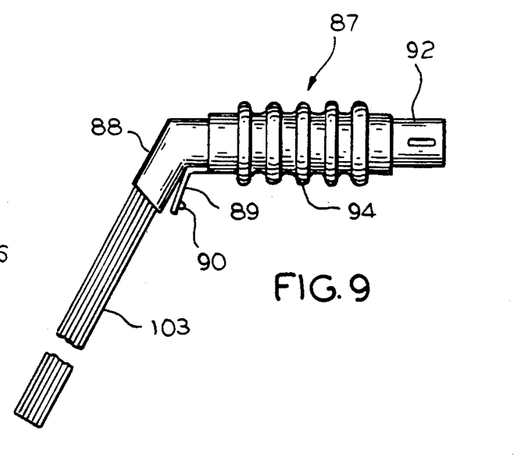
FIG. 9 is an enlarged view of one tree branch connector showing details of construction.

As shown in FIGS. 1 and 6, individual simulated tree branches, such as branch 86, are connected to each trunk member at each hole in the annular shoulders at the tiers of the trunk by way of a tree branch connector 87. A preferred branch connector is shown in detail in FIGS. 8 and 9 and includes a tubular member having one end 88 received within the mounting hole of the trunk member. To secure the connector, a flexible flap or other resilient member 89 carrying a pin or projection 90 is provided which is receivable in a transverse hole 91 provided in the outer wall of each trunk member just below the mounting hole. The connectors are easily removable by depressing the pin inwardly to clear the retention hole so as to allow the connector to be pulled upwardly out from the mounting hole.

As shown in FIGS. 6 and 10-13, the simulated branches are secured to an opposite end 92 of the branch connectors, for example, by inserting the end of the branch into the tubular connector and crimping a portion 93 of the connector to the branch. Each branch connector is adapted to provide for adjustment of the angular relationship of the branch connector relative to the tree trunk so as to allow the user to provide different tree shapes and branch orientations in accordance with his desires. Adjustment is provided by a convoluted hinge portion 94 of the branch connector which allows the connector to be bent at the convolutes. A rigid but bendable, tubular, convoluted, plastic construction will provide for changing and retention of the angle of the convoluted portion and thus the orientation of the branch. Other connector and hinge constructions are also possible including rubber or other bendable materials.

Figure 10:
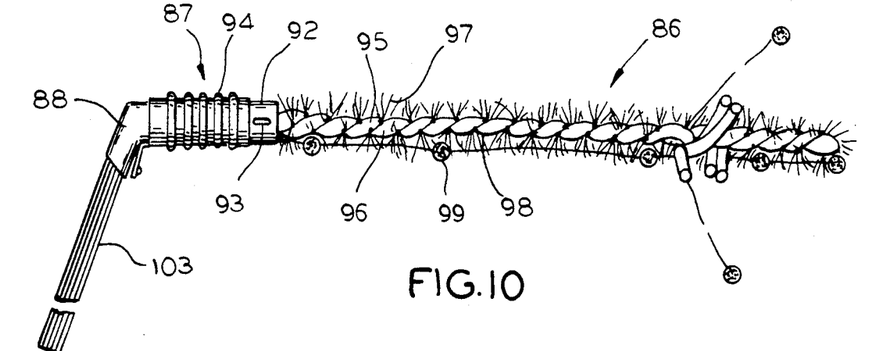
FIG. 10 is a side view of a simulated tree branch according to a preferred embodiment showing details of construction.
Figure 11:
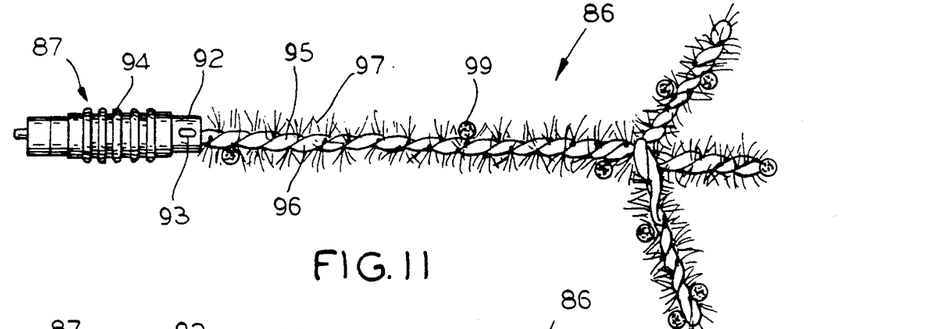
FIG. 11 is a top view of the simulated tree branch according to FIG. 10 showing further details of construction.

Two simulated branch constructions are contemplated. According to one embodiment as shown in FIGS. 10 and 11, each branch includes a pair of twisted wires 95, 96 having simulated tree needles 97 clamped between the twisted wires which fan or spray out when the wires are twisted together. This specific aspect of this embodiment of the branch is generally known in the art however, according to the invention, in this construction, a separate straw-like tube 98 for guiding the individual optical fibers out into the branch is attached to the twisted wires along their length beginning at the branch connector. The individual optical fibers are carried within the tube and protrude through small holes in the straw-like tube at desired light emitting points, such as point 99 in FIGS. 10 and 11, within the branch.

Figure 12:
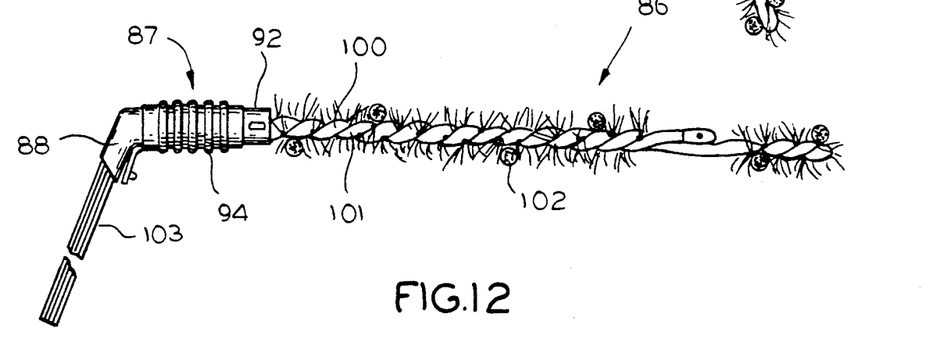
FIG. 12 is a side view of a simulated tree branch according to an alternative embodiment showing details of construction.
Figure 13:
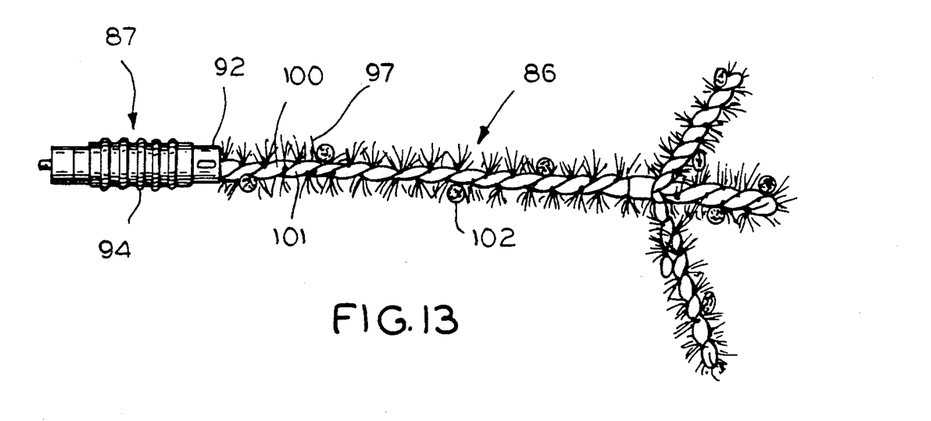
FIG. 13 is a top view of the tree branch according to FIG. 12 showing further details of construction.

According to an alternative embodiment as shown in FIGS. 12 and 13, each branch 86 is comprised of a pair of twisted tubes 100, 101 also having simulated branch needles secured between the tubes which fan or spray out when the tubes are twisted together. In this construction, the individual optical fibers are carried directly within the tubes which make up the branch and protrude from holes at desired light emitting points, such as point 102. As shown in FIGS. 6 and 9-11, one fiber optic bundle 103 comprising a plurality of individual optical fibers extends through each guide tube within the tree trunk from the lower end of the trunk with one end of each optical fiber opening to the aperture in the base. Accordingly, each optical fiber is exposed to a different annular light pattern as programmed onto the disc by the user. Each fiber optic bundle passes through one branch connector with the individual optical fibers extending out along the respective branches in accordance with the specific branch construction hereinabove described and terminating in light emitting points. According to a preferred embodiment shown in FIG. 1, the optical fibers comprising the fiber optic bundle that is carried in the central guide tubes 82, 85 of the tree trunk protrude out from the very top of the tree trunk and form a star or umbrella-like display or ornament 104 at the top of the tree.

It is known that light is conventionally emitted and great effort is taken to assure that light is emitted coaxially from an optical fiber with as little dispersion and scattering as possible. To the contrary, and in accordance with an important and advantageous feature of the present invention, a more pleasing, glowing and realistic bulb-like appearance at each light emitting point is desirable and is achieved by providing a light scattering member 105 at the terminal end of each optical fiber. It has been found that the light emitted from an optical fiber can be scattered in substantially all directions by providing a medium at the terminal end of the optical fiber having a plurality of bubbles, such as air bubbles, dispersed throughout the medium. Light emitted into the medium from the optical fiber is reflected and refracted at the interface between the medium material and bubbles providing for scattering of the light in substantially all directions as shown by the arrows designated L in FIGS. 14A and 14B.

A preferred light scattering member 105 is shown in FIG. 14A and includes a light transparent sleeve having a tubular portion 106 slidably received over the end portion of the optical fiber 107 and a hollow portion 108, preferrably being spherical, into which the light emitting end of the optical fiber extends and terminates. A light scattering medium 109, preferably being an optical fiber adhesive, into which air bubbles 110 have been introduced is carried within the hollow spherical portion 108. Optical adhesives are well known and are specially formulated to have excellent light transmitting qualities. As noted above, air bubbles are introduced into the optical adhesive by, for example, vigorously shaking the adhesive or injecting air into the adhesive with a hypodermic needle. After introducing the air bubbles, the sleeve and bulb are filled with the adhesive and placed on the end of the optical fiber. As is conventional, the adhesive is cured by ultraviolet light and the sleeve is thus secured to the optical fiber with the bubbles trapped within the adhesive.

An alternative light scattering member is shown in FIG. 14B and is similar to that of FIG. 14A except that the bulb portion of the member is a cup-like construction 111 which is filled with the optical adhesive 109 which is provided with the bubbles 110. The adhesive is retained in the cup after being cured by ultrviolet light.

In both embodiments, the inside diameter of the tubular portion 106 is slightly larger than the diameter of the optical fiber to accommodate entry of the adhesive to secure the member to the optical fiber.

It is contemplated that any of the commercially available optical fiber adhesives, such as for example the general purpose adhesive available from The Edmund Scientific Company, Barrington, N.J. under its Stock No. R42,192, will be satisfactory. This same company has other optical adhesives available which are also believed to be satisfactory for the purpose disclosed herein and it is believed that one skilled in the art can readily choose an adhesive that will adhere the material of the light scattering member, which is contemplated to be plastic, to the particular optical fiber material utilized.

The structure of the artificial Christmas tree disclosed provides for disassembly of the tree for easy storage. This is accomplished by disconnecting the individual branch connectors from the tree trunk by disengaging the pins associated with the branch connectors from the retention holes, removing the branches and connectors and fiber optic bundles from the individual guide tubes as an assembly and separating the individual tree trunk members. As desired, the lower tree trunk member can be left attached to the base or separated.

Alternatively, the branches of the tree can be left connected to the tree trunk and the hinges pivoted to orientate the branches substantially collapsed against the trunk.

Having described the preferred embodiment of the invention, those skilled in the art having the benefit of the description and the accompanying drawings can readily devise other embodiments and modifications and such other embodiments and modifications are to be considered to be within the scope of the appended claims.

What is claimed is:

1. An artificial Christmas tree comprising:
   a base including a compartment having an aperture in an upper wall opening into said compartment;
   a tree trunk including at least one internal passage and a plurality of holes disposed along its length opening into said at least one internal passage, said tree trunk mounted to said base with said at least one internal passage opening into said aperture in the upper wall of said base;
   a light source mounted in said compartment of the base;
   a plurality of tree branches mounted to said tree trunk at said openings in said tree trunk;
   a plurality of optical fibers in said at least one internal passage in said tree trunk each having one end opening to said aperture in said upper wall of the base, at least one optical fiber extending through each opening in said trunk along each branch and including at least one light emitting point on said branch;
   a replaceable light transparent selected colored disc having a color pattern, said disc selected from a plurality of programmable colored discs each being colored in a desired pattern to produce a desired light emitting display at said light emitting points; and
   disc drive means for holding and rotating said selected colored disc between said light source and said aperture in said upper wall of the base said disc drive means including a drive motor mounted in said compartment of the base and a disc holding member including a cartridge or tray removably mounted in said compartment of the base adapted to removably hold said replacable selected colored disc and wherein said drive means includes means in said cartridge or tray to be rotatably driven by said drive motor when mounted in said compartment of the base.

2. The artificial Christmas tree as defined in claim 1 wherein said disc holding member includes a ring gear-like member having a central opening, said selected color disc removably positioned on said ring gear member with a colored portion of the disc disposed over said central opening, said ring gear engageable with a drive gear on said drive motor with said ring gear positioned in said compartment of the base with the central opening in the ring gear coaxial with the aperture in said upper wall of said base.

3. The artificial Christmas tree as defined in claim 2 wherein said disc holding member includes a tray having opposing side walls including aligned openings, said ring gear being mounted between said side walls with the central opening in the ring gear coaxial with the openings in said side walls.

4. The artificial Christmas tree as defined in claim 3 wherein an inner peripheral edge of said ring gear protrudes into the openings in said side walls forming an annular ledge, said colored disc supported on said annular ledge.

5. The artificial Christmas tree as defined in claim 3 wherein said base includes support and guide means within said compartment for slidably receiving said disc holding member case and stop means associated with said support and guide means contacting said disc holding member case when positioned in said compartment with said ring gear engaged to said drive gear on said drive motor.

6. The artificial Christmas tree as defined in claim 1 wherein said tree trunk is longitudinally tiered forming a plurality of longitudinally spaced apart concentric annular shoulders along the length of said tree trunk, said plurality of holes being disposed in each annular shoulder.

7. The Christmas tree as defined in claim 6 wherein said tree trunk includes at least two elongated longitudinally stepped circular members, a portion of at least one of said at least two longitudinally stepped members being slidably received in at least a portion of the second of said at least two longitudinally stepped members.

8. The artificial Christmas tree as defined in claim 7 including a plurality of internal passages in said tree trunk defined by a plurality of fiber optic guide tubes, one guide tube extending coaxially from each hole in each annular shoulder internally through said tree trunk terminating proximate a lower end of the tree trunk and opening toward the aperture in the upper wall of the base, at least one optical fiber extends through each guide tube.

9. The artificial Christmas tree as defined in claim 8 including a plurality of tubular branch attachment members, one branch attachment member removably connected to said tree trunk at each of said holes in said annular shoulders, one of said plurality of branches connected to each branch attachment member.

10. The artificial Christmas tree as defined in claim 9 including a plurality of fiber optic bundles each bundle comprising a plurality of optical fibers, one bundle extending through each guide tube, and tubular branch attachment member, said optical fibers extending along a respected one of said plurality of branches terminating in said light emitting point.

11. The artificial Christmas tree as defined in claim 10 wherein said tubular branch attachment members include means for adjusting the angular orientation of said branch attached thereto relative to said tree trunk.

12. The artificial Christmas tree as defined in claim 11 wherein said means for adjusting the angular orientation of each branch comprises a bendable portion of said branch attachment member.

13. The artificial Christmas tree as defined in claim 12 wherein said bendable portion includes a longitudinally convoluted section in each tubular attachment member.

14. The artificial Christmas tree as defined in claim 12 wherein each of said branches comprises at least one tubular branch member having simulated tree needles affixed thereto, said optical fibers extending into said at least one tubular branch member and having said light emitting points exposed through holes in said at least one tubular branch member.

15. The artificial Christmas tree as defined in claim 10 wherein each of said branch members comprises a pair of twisted wires having simulated tree needles affixed thereto, said optical fibers extend into a tube affixed to and extending along the length of said pair of twisted wires, said light emitting points exposed through holes in said tube.

16. An artificial Christmas tree comprising;
   a hollow base having an aperture in an upper wall;
   a light source mounted in said base generally coaxial with said aperture in said upper wall;
   a simulated tree trunk mounted to said base over said aperture in said upper wall, said tree trunk including a plurality of simulated tree branch connection openings;

a plurality of guide tubes within said tree trunk, each guide tube opening at one end to a respective one of said plurality of tree branch connection openings and opening at an opposite end to said aperture in said upper wall of said base;

a plurality of simulated tree branches, one connected to said tree trunk at each of said tree branch connection openings;

a plurality of fiber optic bundles, each bundle including a plurality of individual optical fibers, each bundle extending through one of said plurality of guide tubes, one of said tree branch connection openings and along at least a portion of one of said tree branches, each optical fiber opening at one end to said aperture in said upper wall of the base and including at least one light emitting point disposed in said tree branch;

means in said base providing for mounting and removing an infinite number of different interchangeable light transparent color pattern programmable discs between said light source and said one end of each of said fiber optic cables; means for rotating a disc.

17. The artificial Christmas tree as defined in claim 16 wherein said means for rotating includes a drive motor mounted in said base including a drive gear, a disc holding tray including a ring gear rotatably mounted in said disc tray having a central opening coaxial to an opening through said disc tray, said programmable discs being removably positioned on said ring gear with the color pattern of the disc disposed across said central opening of the ring gear and said opening in said disc tray; and means in said base for removably, slidably receiving, supporting and positioning said disc tray within said base with the central opening in said ring gear coaxial to said aperture in the upper wall of said base with said ring gear engaged with said drive gear whereby, said color pattern of the disc is rotatably, removably positioned between said light source and one end of each of said optical fibers for creating an infinite number of colors and color sequences at said light emitting locations in said tree branches.

18. The artificial Christmas tree as defined in claim 16 further including a central guide tube in said tree trunk extending from an uppermost end of the tree trunk to said aperture in the upper wall of said base, some of said plurality of optical fibers extending through said central guide tube protruding from said central guide tube at an uppermost end of the central guide tube forming a display at said uppermost end of the tree trunk.

19. The artificial Christmas tree as defined in claim 17 wherein said disc tray comprises a parallelpiped case having aligned circular openings in opposing sidewalls of the case and a relieved portion at one end of the case, said ring gear mounted in said case with said central opening of the ring gear coaxial to the openings in the sidewalls of the case and with an inner peripheral portion of the ring gear extending partially into said openings in the case defining an annular shoulder, teeth on the external periphery of the ring gear extending into said relieved portion at said one end of the case, said programmable disc supported on said annular shoulder of the ring gear disposed in the opening in the case.

20. The artificial Christmas tree as defined in claim 17 wherein terminal ends of each optical fiber defining said light emitting locations include means for scattering said light emitted from said optical fiber.

* * * * *